Dec. 9, 1969  H. B. KRIEGER ET AL  3,482,644
STEERING CONTROL SYSTEM FOR UNMANNED VEHICLES
Filed Jan. 8, 1968  4 Sheets-Sheet 1

INVENTORS
HERBERT B. KRIEGER &
KENNETH A. WILSON
BY
Barnes, Kisselle, Raisch & Choate
ATTORNEYS

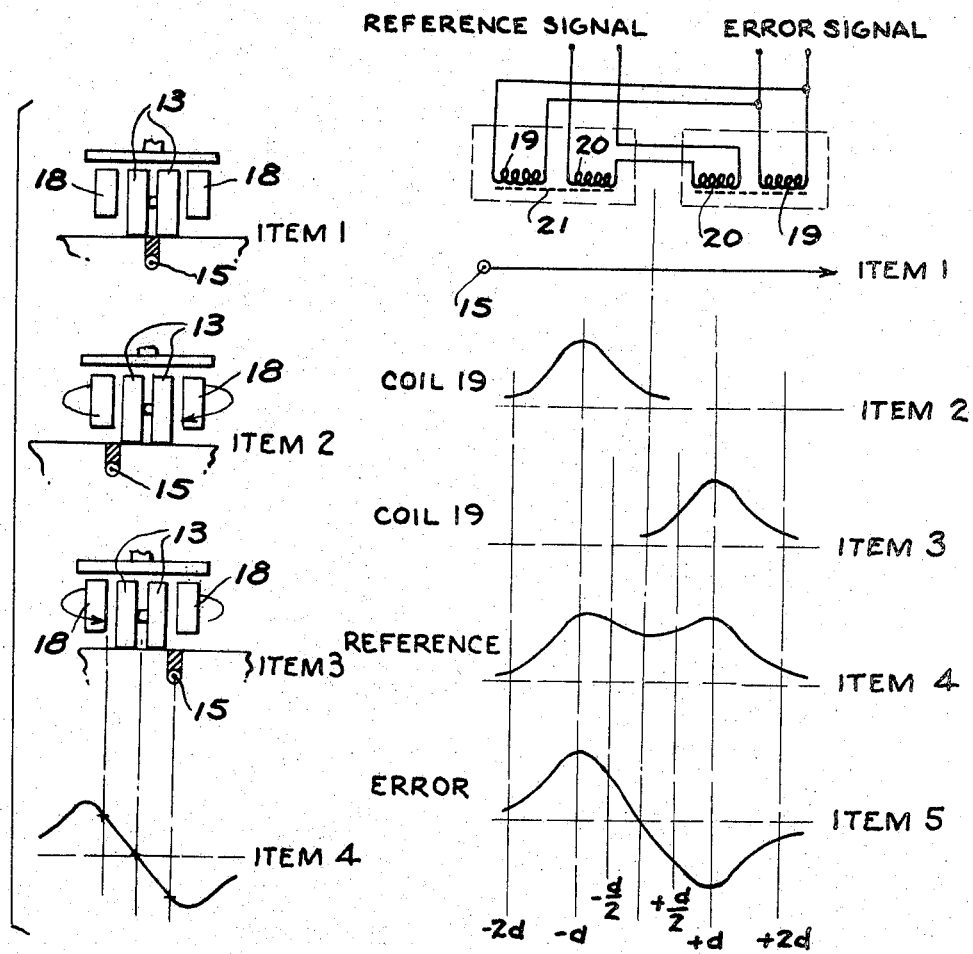
FIG. 4
FIG. 6
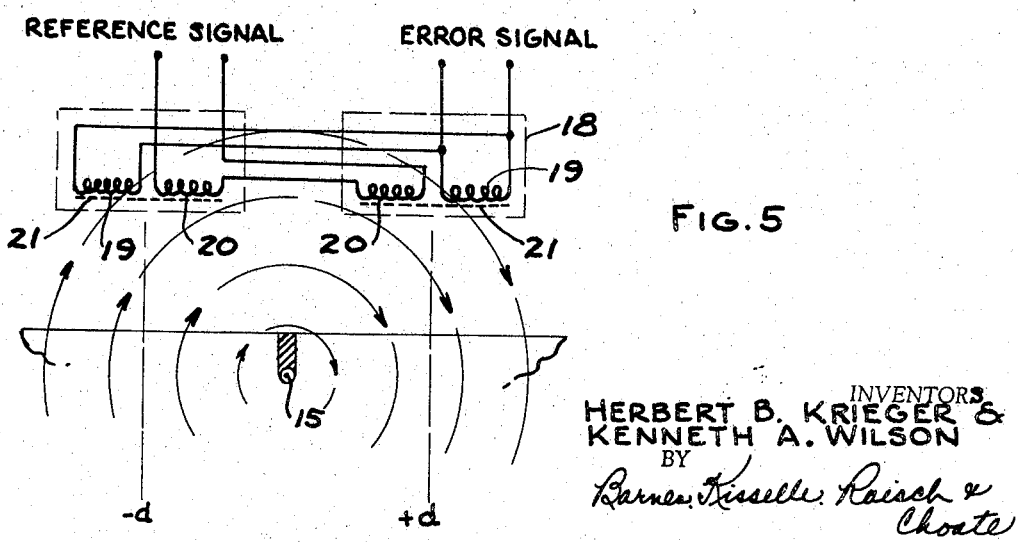
FIG. 5
INVENTORS
HERBERT B. KRIEGER &
KENNETH A. WILSON
BY
Barnes, Kisselle, Raisch & Choate
ATTORNEYS INVENTORS
HERBERT B. KRIEGER &
KENNETH A. WILSON
BY
Barnes, Kisselle, Raisch & Choate
ATTORNEYS United States Patent Office
3,482,644
Patented Dec. 9, 1969

3,482,644
STEERING CONTROL SYSTEM FOR
UNMANNED VEHICLES
Herbert B. Krieger, Port Jefferson Station, and Kenneth A. Wilson, Locust Valley, N.Y., assignors, by mesne assignments, to American Chain & Cable Company, Inc., New York, N.Y., a corporation of New York
Filed Jan. 8, 1968, Ser. No. 696,362
Int. Cl. B60k 27/00; B62d 5/00; G05b 11/00
U.S. Cl. 180—98
6 Claims

ABSTRACT OF THE DISCLOSURE

The steering control system disclosed herein comprises an unmanned vehicle, a steerable wheel on the vehicle and a motor for steering said wheel. A pair of sensors are movable with said wheel and are positioned on opposite sides of a longitudinal line of the vehicle for sensing the relative position of the vehicle to a wire embedded in the floor. Each pair of sensors comprises an error coil and a reference coil. The error coils are connected in parallel and the reference coils are connected in series. Each pair of coils has its axis extending generally parallel to the ground. The signal from each pair of reference coils and each pair of error coils is amplified and compared to produce a DC voltage proportional to the error amplitude and having a polarity dependent on whether the error signal is in phase or out of phase with the reference signal. Means responsive to the speed of the steering motor modifies the DC error voltage. The modified DC error voltage is converted to an AC signal which is in phase or out of phase with the reference signal depending upon the position of the vehicle with respect to the guide path defined by the wire. First circuit means compares the modified AC error signal with the reference signal and generates either a left signal or a right signal. Second circuit means converts the modified AC error signal to a variable frequency output. A pulse signal is then produced by the two circuits through selectively actuated AND gates to rotate the steering motor in one direction or another depending upon whether a left signal or a right signal is generated.

---

This invention relates to unmanned vehicles and particularly to the steering control system for such unmanned vehicles.

In one type of well-known vehicle system used in connection with warehouses and the like, unmanned vehicles or tractors are provided with sensors that sense the presence of a guide path defining a wire embedded in the floor to produce a steering signal to steer the vehicle along the guide path.

Among the objects of the invention are to provide a steering control system for such a vehicle which will effectively guide the vehicle along the guide path; which has a minimum degree of hunt; which will respond rapidly to variations in signal; and which utlizes a novel arrangement of sensing coils.

In the drawings:

FIG. 4 is a series of diagrams and a curve showing the relative relationship of the vehicle and guide path.

FIG. 5 is a partly diagrammatic view of the relationship of the sensors on the vehicle to the embedded wire in the floor.

FIG. 6 is a series of curves showing the relationship of the sensors, guide wire and resultant signal in the sensors.

GENERAL DESCRIPTION

Figure 1:
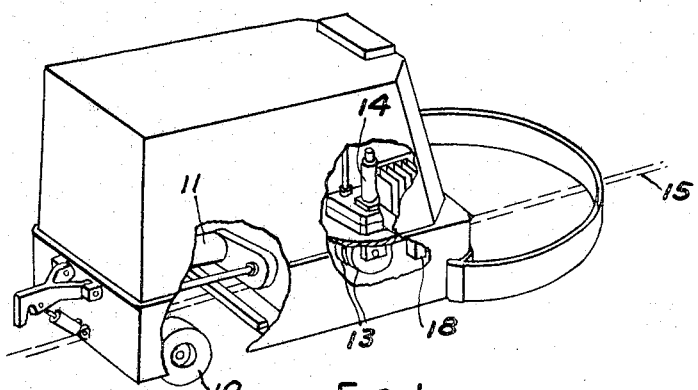
FIG. 1 is a part sectional perspective view of an unmanned vehicle system embodying the invention.

Referring to FIG. 1, the invention relates to a vehicle or tractor T which is of the unmanned or driverless type and comprises rear wheels 10 driven by a motor 11 and a front dirigible type steering wheel 13. Steering motor 14 is operable to rotate the wheel to the right or to the left to guide the wheel and, in turn, the vehicle T along the guide path 15 defined by a wire embedded in the ground and energized, for example, by a high frequency alternating current on the order of 2 kHz. A tachometer C also is driven by the motor 14.

Figure 2:
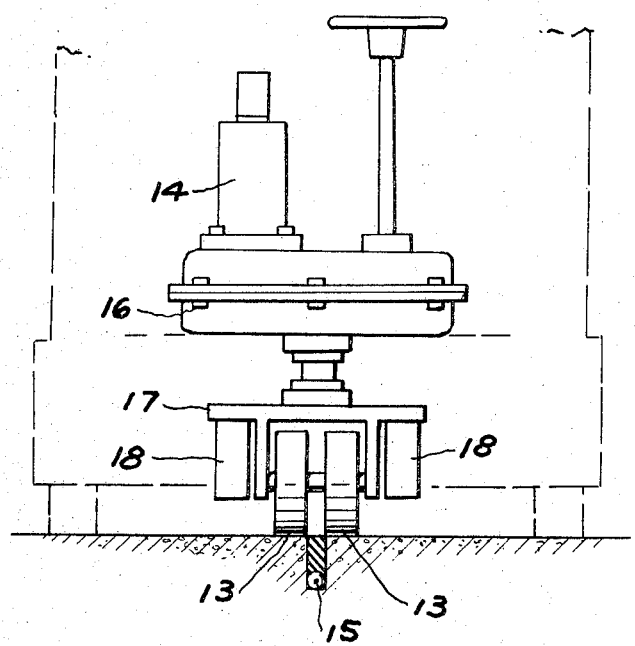
FIG. 2 is a front elevational view of the vehicle with parts being broken away.
Figure 3:
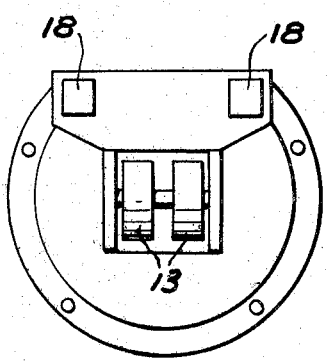
FIG. 3 is a fragmentary bottom plan view of the front portion of the vehicle.

As further shown in FIG. 2, steering motor 14 drives the steerable wheel 13 through a transmission 16. The steerable wheels 13 are mounted on a frame 17 that also supports steering sensors 18 on opposite sides of the steering wheels 13. It can be appreciated that one or more steering wheels can be provided.

The steering control system embodying the invention controls the steering of the tractor by controlling the operation of the DC steering motor 14 connected to the front wheels 13. The steering control system receives signals from the two guide path sensors 18 attached to the front wheel assembly. Each sensor 18 consists of two coils 19, 20 wound on a highly permeable magnetic core 21, which sense the 2 kHz. magnetic field radiated by the guide wire 15 in the filoor.

Referring to FIG. 5, the coils 19 are known as error coils and are connected in parallel so that their signals subtract from one another. The coils 20 are known as reference coils and are connected in series so that the signals add to one another. The coils 19, 20 of each sensor 18 are wound on their respective core 21 and are positioned with their axes substantially horizontal to the floor and transversely of the vehicle. As shown in FIG. 5, such an arrangement makes the coils more responsive to the horizontal component of field and produces a more constant reference signal over the usable range of error signal, as contrasted to a vertical orientation of the coils. Further, if the reference coils are oriented vertically, there will be a phase change in the reference signal with respect to the error signal as the guide wire passes directly under one of the reference coils. Whereas, when the reference coils are oriented horizontally, as described, there will be no phase change in the reference signal with respect to the error signal as the guide wire passes directly under one of the reference coils, as shown in FIG. 6, Item 4.

The relationship of the sensors 18 and their respective coils to the position of the guide path wire 15 is shown diagrammatically in FIG. 6. As shown in Item 1, the AC signal generated in either sensor 18 is a function of the distance of the wire 15 from the sensor 18. Item 2 is a graphical representation of the relative amplitude of the signal generated in an error coil 19 as the vehicle is moved horizontally sideways relative to guide wire 15. Item 3 shows the relative signal strength for the other error coil 19. The resultant signal from reference coils 20, which are connected in parallel, called the reference signal, is shown in Item 4. When the two coils 19 are connected together so as to subtract their signals one from another, the resultant AC signal called the error signal is as shown in Item 5.

When the error signal is above the horizontal axis, it is in-phase with the reference signal, and when the error signal is below the horizontal axis, it is 180 degrees out-of-phase with the reference signal. Comparing Items 4 and 5 with Item 1, it can be seen that the error signal is in-phase with the reference signal when the guide path wire is to the left of the centerline, and the error signal is out-of-phase with the reference signal when the guide path wire is to the right of the centerline. Within the normal steering range from $+d/2$ to $-d/2$, the reference signal remains fairly constant, while the error signal increases in proportion to the horizontal distance of the centerline of the coils to the guide path wire.

In FIG. 4, Item 1 shows the tractor's front wheels 13 and steering coil sensors 18 sitting directly over the guide path 14. The corresponding error signal is zero, as shown in Item 4. Item 2 shows the tractor's front wheels sitting to the right of the guide path. The arrow indicates that the steering motor must turn the wheels to the left to bring the tractor back onto the guide path. Item 4 shows that in this case, the error signal is in-phase with the reference signal. Item 3 shows the tractor's front wheels sitting to the left of the guide path. The arrow indicates that the steering motor must turn the wheels to the right to bring the tractor back on the guide path. Item 4 shows that the corresponding error signal is 180 degrees out-of-phase with the reference signal.

Figure 7:
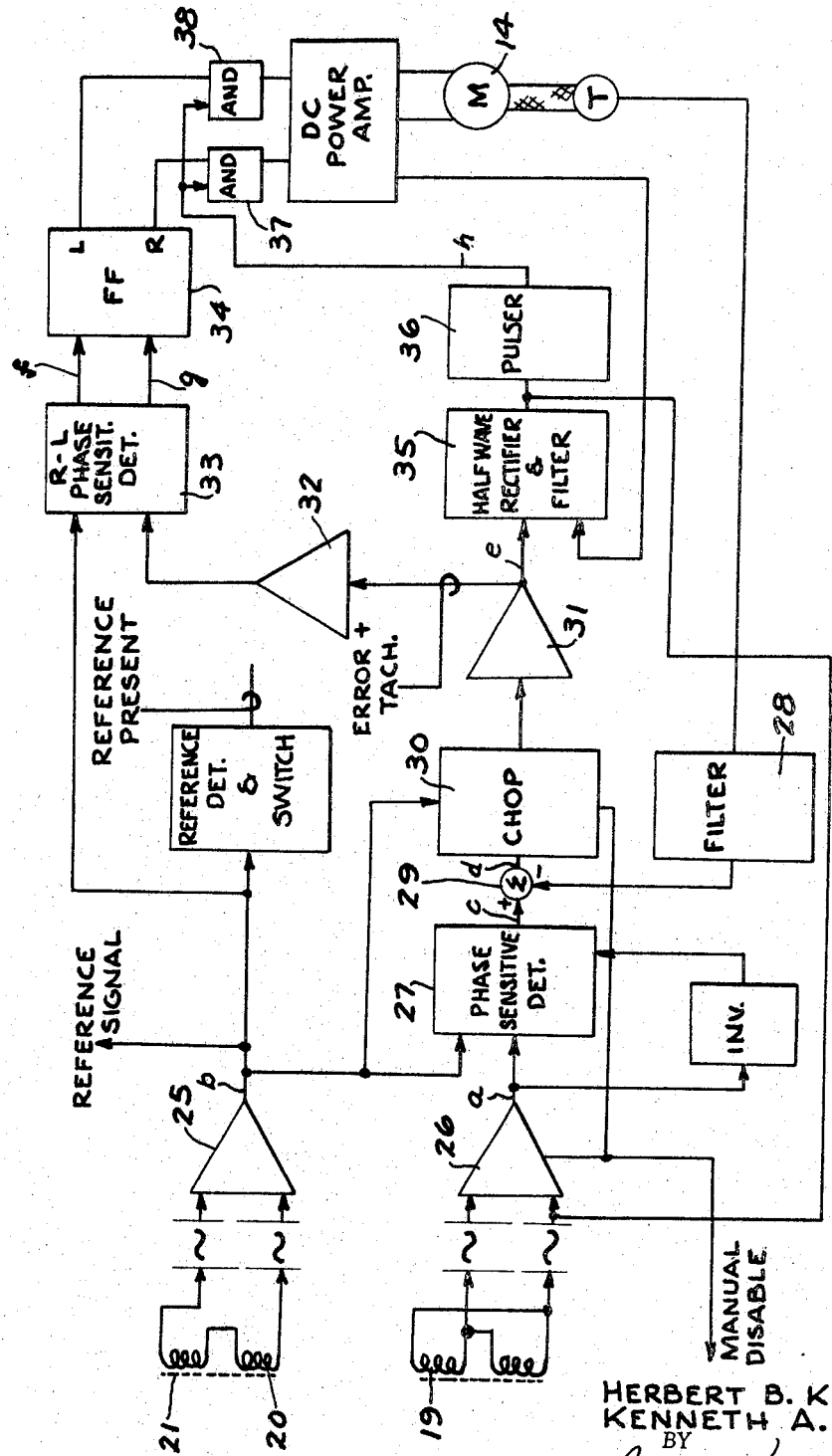
FIG. 7 is a schematic wiring diagram of the steering control system.

FIG. 7 is a schematic diagram of the steering control system. The steering sensors 18, the tachometer C and the steering motor 14 are mechanically linked together. The AC error and reference signals $a$ and $b$ from the steering coils are amplified by AC amplifiers 25, 26 and compared in a phase sensitive detector 27 to produce a DC error voltage signal $c$ which is proportional to the error amplitude. The polarity of the DC voltage signal $c$ is positive or negative depending on whether the error signal is in-phase 180 degrees or out-of-phase with the reference signal.

The tachometer C provides a DC voltage proportional to the speed of the motor 14 and which has a polarity that is positive or negative depending on whether the motor 14 is rotating clockwise or counterclockwise. The tachometer signal is suitably filtered by a filter 28 and then subtracted from the error signal in a summer 29. The modified error output from the summer 29 is a DC voltage signal $d$, the amplitude of which increases as the error signal increases and the amplitude of which decreases as the motor speed increases. The resulting effect is that the speed of the motor is modified by the tachometer signal.

The modified DC error signal $d$ is now converted to an AC signal by a chopper 30 and amplified by an amplifier 31. The resulting AC error signal $e$ will be in-phase or 180° out-of-phase with the reference signal depending upon the position of the wheels with respect to the guide path. This modified AC error signal $e$ is now directed to two different circuits. The first circuit comprises an amplifier 32 and a phase sensitive detector 33 and compares the error signal with the reference signal and generates either a right signal $f$ if the error signal is 180° out-of-phase with the reference signal or a left signal $g$ if the error signal is in-phase with the reference signal. Signals $f$ and $g$ set a flip-flop 34. The second circuit comprises a half-wave rectifier and filter 35 and a pulser 36 and converts the modified AC error signal $e$ to a variable frequency pulse output $h$.

Figure 8:
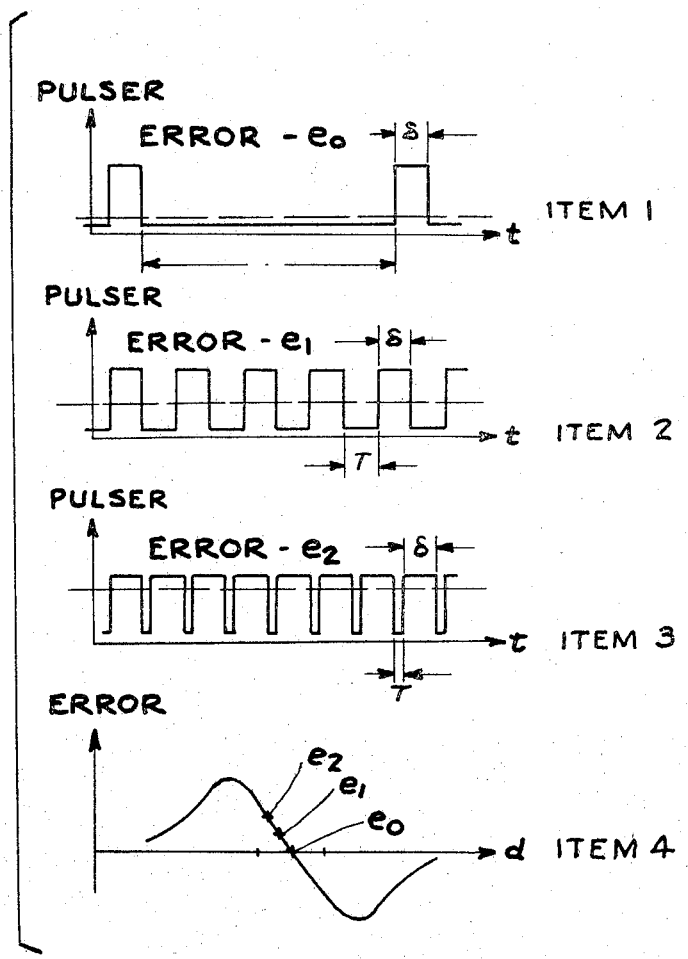
FIG. 8 is a series of pulse diagrams showing the relationship of the steering motor drive signals to the error signal.

FIG. 8 shows these output pulses for three different values of error signal. The width of each pulse $\delta$ is constant and the time interval $\tau$ between pulses is proportional to the error signal voltage. The larger the amplitude of the modified error signal $e$, the shorter is the time interval $\tau$. For a given error amplitude $e_1$, for example, the pulser output will be as shown in Item 2, independent of the phase of the error signal.

As shown in FIG. 7, the left or right signal $f$, $g$ actuates flip-flop 34 to supply a signal to one of two AND gates 37, 38. The pulse output $h$ is also directed to both of the AND gates 37, 38 but will not pass through the AND gates unless there is either a left or a right signal from flip-flop 34. The passage of the pulse output $h$ to the DC power amplifier and, in turn, to the motor 14 is thus controlled by the AND gates 37, 38 to drive either the left motor winding or the right motor winding, depending on the phase of the modified error voltage $e$. The motor 14 will continue to drive the front wheel assembly until the front wheels 13 are positioned directly over the guide path, at which point the error signal $e$ is zero, the pulser output $h$ is zero and the motor 14 will stop rotating. The motor's drive signal is pulsed to reduce power losses in the driving transistors.

A feedback signal is provided from the power amplifier to the half-wave rectifier and filter 35.

In addition, a feedback signal is provided from the half-wave rectifier and filter 35 to the input of the AC amplifier 26. This feedback eliminates small oscillations or hunting when the truck is standing still or following a straight path. This is achieved in the following manner. As an error signal is provided, it is initially of large magnitude. As the error signal becomes less in value and reaches a point wherein it has lesser value than the tachometer feedback signal, the phase of the modified error signal $d$ changes and, as a result, the 2 kHz. AC component of the output of the half-wave rectifier and filter 35 is 180 degrees out-of-phase with the error coil voltage. This voltage is fed back to the error coil amplifier 26 to provide a degenerative feedback.

What is claimed is:
1. The combination comprising
   a vehicle,
   a steerable wheel on said vehicle,
   a motor for steering said wheel,
   a pair of sensors movable with said wheel positioned on opposite sides of a longitudinal line of said vehicle for sensing the relative position of the vehicle to a wire embedded in the floor,
   each sensor comprising an error coil and a reference coil,
   the error coils being connected in parallel and the reference coils being connected in series,
   the error and reference coils of each sensor having their axes extending generally parallel to the ground,
   means for amplifying the signal from each pair of reference coils and each pair of error coils,
   means for comparing said signal and producing a DC error voltage signal proportional to the error amplitude and having a polarity dependent on whether the error signal is in phase or out of phase with the reference signal,
   means responsive to the speed of the steering motor for modifying said DC error voltage signal,
   means for converting said modified DC error voltage signal to an AC signal which is in phase or out of phase with the reference signal depending upon the position of the vehicle with respect to the guide path defined by the wire,
   first circuit means for comparing the modified AC error signal with the reference signal and generating either a left signal or a right signal,
   second circuit means for converting the modified AC error signal to a variable frequency output,
   and means responsive to said signals from said first and second circuits for producing a pulse signal to rotate the steering motor in one direction or another depending upon whether a left signal or a right signal is generated.
2. The combination set forth in claim 1 wherein said second circuit means comprises a half-wave rectifier and filter,
   and a third circuit connecting the output of said half- wave rectifier and filter to said means for amplifying the error signal.

3. The combination set forth in claim 1 wherein said means for producing a pulse signal for operating said steering motor comprises a pair of AND gates to which the output of said second circuit is provided, said left signal of said first circuit being provided to one of said AND gates and said right signal of said first circuit being provided to the other of said AND gates.

4. The combination comprising
a vehicle,
a steerable wheel on said vehicle,
a motor for steering said wheel,
a pair of sensors movable with said wheel positioned on opposite sides of a longitudinal line of said vehicle for sensing the relative position of the vehicle to a wire embedded in the floor,
each sensor comprising an error coil and a reference coil,
the error coils being connected in parallel and the reference coils being connected in series,
means for amplifying the signal from each pair of reference coils and each pair of error coils,
means comparing said signal and producing a DC error voltage signal proportional to the error amplitude and having a polarity dependent on whether the error signal is in phase or out of phase with the reference signal,
means responsive to the speed of the steering motor for modifying said DC error voltage signal,
means for converting said modified DC error voltage signal to an AC signal which is in phase or out of phase with the reference signal depending upon the position of the vehicle with respect to the guide path defined by the wire,
first circuit means for comparing the modified AC error signal with the reference signal and generating either a left signal or a right signal,
second circuit means for converting the modified AC error signal to a variable frequency output,
and means responsive to said signals from said first and second circuits for producing a pulse signal to rotate the steering motor in one direction or another depending upon whether a left signal or a right signal is generated,
said second circuit means comprising a half-wave rectifier and filter,
and a third circuit connecting the output of said half-wave rectifier and filter to said means for amplifying the error signal.

5. The combination set forth in claim 4 wherein said means for producing a pulse signal for operating said steering motor comprises a pair of AND gates to which the output of said second circuit is provided, said left signal of said first circuit being provided to one of said AND gates and said right signal of said first circuit being provided to the other of said AND gates.

6. The combination comprising
a vehicle,
a steerable wheel on said vehicle,
a motor for steering said wheel,
a pair of sensors movable with said wheel positioned on opposite sides of a longitudinal line of said vehicle for sensing the relative position of the vehicle to a wire embedded in the floor,
each sensor comprising an error coil and a reference coil,
the error coils being connected in parallel and the reference coils being connected in series,
the error and reference coils of each sensor having their axes extending generally parallel to the ground.

References Cited

UNITED STATES PATENTS

| | | | |
|---|---|---|---|
| 2,742,099 | 4/1956 | Hagen | 180—79.1 |
| 3,009,525 | 11/1961 | De Liban | 180—98 |
| 3,033,305 | 5/1962 | Harned et al. | 180—98 X |
| 3,250,983 | 5/1966 | Atkinson | 318—30 X |

KENNETH H. BETTS, Primary Examiner

U.S. Cl. X.R.

180—79.1; 318—18, 28

Disclaimer 3,482,644.—*Herbert B. Krieger*, Port Jefferson Station, and *Kenneth A. Wilson*, Locust Valley, N.Y. STEERING CONTROL SYSTEM FOR UNMANNED VEHICLES. Patent dated Dec. 9, 1969. Disclaimer filed Feb. 24, 1972, by the assignee, *Clark Equipment Company*.

Hereby enters this disclaimer to claim 1 of said patent.

[*Official Gazette August 1, 1972.*]